(12) United States Patent
Liu

(10) Patent No.: US 6,400,508 B1
(45) Date of Patent: Jun. 4, 2002

(54) COMPACT WAVELENGTH INTERLEAVER

(76) Inventor: Zhimin Liu, 3469 N. First St., San Jose, CA (US) 95134-1803

( * ) Notice: Subject to any disclaimer, the term of this patent is extended or adjusted under 35 U.S.C. 154(b) by 0 days.

(21) Appl. No.: 09/695,766

(22) Filed: Oct. 24, 2000

Related U.S. Application Data

(60) Provisional application No. 60/162,853, filed on Nov. 1, 1999.

(51) Int. Cl.$^7$ ................................................. G02B 5/30
(52) U.S. Cl. ........................ 359/495; 359/129; 359/496; 359/497
(58) Field of Search ................................ 359/124, 127, 359/129, 484, 494, 495, 496, 497, 640

(56) References Cited

U.S. PATENT DOCUMENTS 6,052,228 A * 4/2000 Xie et al. .................... 359/497
6,208,444 B1 * 3/2001 Wong et al. ................. 359/127

* cited by examiner

Primary Examiner—Darren Schuberg
(74) Attorney, Agent, or Firm—Fish & Richardson P.C.

(57) ABSTRACT

This invention discloses an optical interleaver. The optical interleaver includes an input port for receiving an input light beam including a plurality of wavelengths represented by $\lambda 1, \lambda 2, \lambda 3, \ldots, \lambda n$ where n is a positive integer. The interleaver further includes a group of optical elements for decomposing the input light beam into a first light beam including a first set of wavelengths represented by $\lambda 1, \lambda 3, \lambda 5, \ldots, \lambda n$ and a second light beam including of a second set of wavelengths represented by $\lambda 2, \lambda 4, \lambda 6, \ldots, \lambda n-1$, wherein the first light beam and the second light beam transmitted respectively in a first and second optical paths, and the group of optical elements further decomposing and generating two sets of mutually orthogonally polarized and parallel beam-components from the first beam and second beam. The interleaver further includes an incline angle means coupled to the group of optical elements. The incline angle means is used for projecting the two sets of mutually orthogonally polarized and parallel beam-components for the first and second beams respectively with a first incline angle and second incline angle relative to an optical axis of the interleaver. And, the interleaver further includes an output beam-component combining means for combining the mutual orthogonally polarized and parallel beam-components into a first output beam and a second output beam projected with the first and second incline angles respectively relative to the optical axis of the interleaver. In a preferred embodiment, the interleaver further includes a dual fiber collimator having a first optical fiber and a second optical fiber disposed off-axis of the collimator for directly receiving the first output beam and the second output beam projected respectively with the first and second inclined angles.

29 Claims, 3 Drawing Sheets

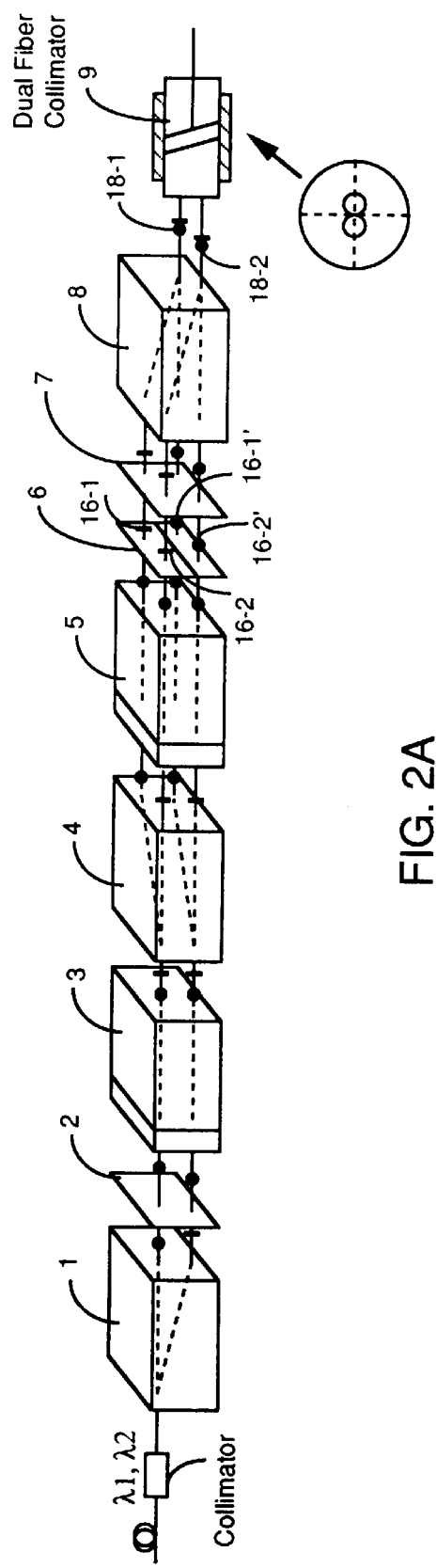
FIG. 2A
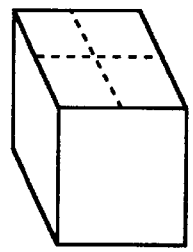
FIG. 2B
| UL | UR |
|----|----|
| LL | LR |
FIG. 2C

COMPACT WAVELENGTH INTERLEAVER

This Formal Application claims a Priority Date of Nov. 1, 1999 benefited from a Provisional Application Ser. No. 60/162,853, filed by the same Applicant of this Application on Nov. 1, 1999.

FIELD OF THE INVENTION

The present invention relates generally to a signal transmission system implemented with optical fibers and related optical components. More particularly, this invention relates to an optical interleave device implemented in a dense wavelength division multiplexing (DWDM) system.

BACKGROUND OF THE INVENTION

As the optical wavelength division multiplexing (WDM) technology gradually becomes the standard backbone network for the fiber optic communication systems, a challenge is continuously faced by those of ordinary skill in the art to increase the transmission capacity due to the bandwidth limitations of the optical fiber signal transmission systems. Specifically, the bandwidth of the optical fiber amplifier, such as Erbium doped fiber amplifier (EDFA), is limited as more and more channels are inserted into the transmission band. The wavelength spacing between adjacent channels employed for carrying the optical signals becomes narrower when more channels are "squeezed in" the transmission band for the purpose of satisfying a requirement of increasing the transmitting capacity of the signal transmission system. However, the wavelength division multiplexing (WDM) technologies employing dielectric filters are confronted with a limitation due to the ability to separate one channel from adjacent ones when the channel spacing is further reduced with increased number of channels.

As the WDM technology now enables the utilization of substantially wider fiber bandwidth for signal transmission, a number of prior art patents disclosed methods and configurations deal with problems of multiplexing, demultiplexing, and routing optical signals such that these systems can become commercially viable. Particularly, these disclosures deal with problems arise from addition of the wavelength domain that increases the complexity for network management because processing now involves both filtering and routing. Multiplexing involves the process of coupling many wavelengths in the same fiber. Demultiplexing is the opposite process in which wavelengths coupled in the same fiber are separated. The individual channels are spatially separated and coupled to specific output ports. Routing differs from demultiplexing in that a router spatially separates the input optical channels into output ports and permutes these channels according to control signals to a desired coupling between an input channel and an output port.

Lyot Orman invented a first birefringent filter in 1933, and in 1953, Solc further disclosed a different type of birefringent filter. These two types of birefringent filters provide a special function of selecting desired wavelengths in certain polarization state and in the meantime, select the adjacent wavelength with a perpendicular polarization state. Lyot's birefringent filter is previously employed by a prior art Patent for a switchable wavelength router. Specifically, a conventional switchable router is disclosed by Wu et al. in U.S. Pat. No. 5,694,233 entitled "Switchable Wavelength Router" (issued on Dec. 2, 1997) and is now incorporated herein by reference for all purposes in the Patent Application. Wu et al. disclosed a switchable wavelength router as that shown in FIG. 1. The switchable wavelength router 999 has a first birefringent element 30 that decomposes and spatially separates an incoming WDM optical signal into two orthogonally polarized beams 101 and 102. A first polarization rotator 40 selectably rotates the polarization of one of the beams to match the polarization of other beam, based on an external control signal. A wavelength filter 61 (e.g., stacked waveplates) provides a polarization-dependent optical transmission function such that the first beam decomposes into third and fourth orthogonal beams, and the second beam decomposes into fifth and sixth orthogonal beams. The third and fifth beams carry a first spectral band at a first polarization and the fourth and sixth beams carry a second spectral band at an orthogonal polarization. A second birefringent element 50 spatially separates these four beams into four horizontally polarized and vertically polarized components. A second polarization rotator 41 rotates the polarizations of the beams so that the third and fifth beams and the fourth and sixth beams are orthogonally polarized. A third birefringent element 70 recombines the third and fifth beams (i.e., the first spectral band), and also recombines the fourth and sixth beams (i.e., the second spectral band) which are coupled to the two output ports based on the control state of the wavelength router. Wu et al. disclosed a switchable wavelength router having an input port for the incoming WDM signals and a two output ports. The router divides the received optical signals into divided optical signals comprising a subset of the channels and spatially positions the divided optical signals in response to a control signal applied to the router. Wu's router can divide a received WDM signals into two subsets that are either single channel or WDM signals.

The disclosure of Wu et al. as discussed above is useful for switchable wavelength routing. It is also useful for a wavelength selector if there is no controlled polarization rotator. However, the router as disclosed is not practical for component miniaturization. Particularly, the arrangement of the two separate output ports 14 and 15 requires two independent collimators separated in certain distance due to the physical shapes and sizes of these collimators. Consequently, as the beams are separated with a spatial distance, a large crystal 50 is required and that would increase the production cost of the router and make the device quite expensive. Long optical path according to Wu's configuration would also increase the insertion loss and increase the volume, size and weight of the router assembly.

In view of the existing technologies, besides the challenge of processing transmission signals carried by wavelengths narrower channel spacing, another challenge in constructing an optical transmission system is to provide miniaturized optical components with improved performance, compact size and lower cost. The task of miniaturization is often difficult to achieve. This is due to the particular reasons that the spacing between adjacent channels in the WDM system is around 0.8 nm and even lower and the device is very sensitive to the accuracy of the central wavelength of the pass band and pass band profile. Additionally, there are stringent requirements for other optical performance parameters such as polarization mode dispersion, polarization dependent loss and other thermal-dependent effects imposed on different operational parameters. Weight and size reductions to miniaturize an optical module such as an interleaver cannot be conveniently achieved taking into consideration of these complexities and design constraints.

Therefore, a need still exists in the art of manufacturing and designing the fiber optic interleaver to provide improved configurations that would reduce the required optical components. Specifically, novel and improved interleaver configurations utilizing less components and can reduce manufacture process to lower the manufacture cost are needed to resolve the difficulties and limitations encountered by the fiber optical industries such that compact fiber optical interleaver can be manufactured at a low production cost.

SUMMARY OF THE PRESENT INVENTION

It is therefore an object of the present invention to provide an improved design and configuration for manufacturing and assembling a fiber optic interleaver with reduced number of components to reduce the weight and volume and lower the production costs. With the improved design and configuration, the aforementioned difficulties and limitations in the prior art can be overcome.

Specifically, it is an object of the present invention to provide an interleaver implemented with improved configuration by employing an incline beam angle directing means for projecting the output beams with small incline angles. Preferably, the incline angle directing means may be a prism for projecting the output beams with small incline angles such that these output beams are received directly into a dual fiber collimator. The optical components are reduced and the optical paths are shortened. Insertion loss is reduced and the production cost is lowered with the improved configuration disclosed in this invention.

Briefly, in a preferred embodiment, the present invention includes an optical interleaver. The optical interleaver includes an input port for receiving an input light beam including a plurality of wavelengths represented by $\lambda 1, \lambda 2, \lambda 3, \ldots, \lambda n$ where n is a positive integer. The interleaver further includes a group of optical elements for decomposing the input light beam into a first light beam including a first set of wavelengths represented by $\lambda 1, \lambda 3, \lambda 5, \ldots, \lambda n$ in certain state of polarization (SOP) and a second light beam including of a second set of A wavelengths represented by $\lambda 2, \lambda 4, \lambda 6, \ldots, \lambda n-1$ in perpendicular state of polarization (SOP), wherein the first light beam and the second light beam transmitted respectively in a first and second optical paths, and the group of optical elements further decomposing and generating two sets of mutually orthogonally polarized and parallel beam-components from the first beam and second beam. The interleaver further includes an incline angle means coupled to the group of optical elements. The incline angle means is used for projecting the two sets of mutually orthogonally polarized and parallel beam-components for the first and second beam respectively with a first incline angle and second incline angle relative to an optical axis of the interleaver. And, the interleaver further includes an output beam-component combining means for combining the mutual orthogonally polarized and parallel beam-components into a first output beam and a second output beam projected with the first and second incline angles respectively relative to the optical axis of the interleaver. In a preferred embodiment, the interleaver further includes a dual fiber collimator having a first optical fiber and a second optical fiber disposed off-axis of the collimator for directly receiving the first output beam and the second output beam projected respectively with the first and second inclined angles.

In summary, this invention discloses an interleaver for separating a multiple wavelengths of a light beam into a first output beam and a second output beam having two different sets of wavelengths. The interleaver includes an incline angle means for projecting the first output beam and the second output beam with a small incline angle relative to an optical axis of the interleaver for the purpose of directly projecting into a first and a second optical fibers of an output dual-fiber collimator.

This invention further discloses a method of applying an interleaver for separating a multiple wavelengths of an input light beam into a first output beam and a second output beam having two different sets of wavelengths. The method includes a step of employing an incline angle means for projecting the first output beam and the second output beam respectively with a first and a second small incline angles relative to an optical axis of the interleaver. In a preferred embodiment, the method further includes a step of employing an output dual-fiber collimator provided with a first and second optical fibers for directly coupling to and receiving from the interleaver the first beam and the second beam respectively each projected with the small incline angle.

These and other objects and advantages of the present invention will no doubt become obvious to those of ordinary skill in the art after having read the following detailed description of the preferred embodiment, which is illustrated in the various drawing figures.

BRIEF DESCRIPTION OF THE DRAWINGS

FIG. 2A shows a perspective view of a polarization independent wavelength interleaver according to a preferred embodiment of this invention;

FIGS. 2B and 2C are respectively a perspective view and a side cross sectional view of an optical element divided into four quadrants for describing the optical paths of different beams and beam components of this invention.

DETAILED DESCRIPTION OF THE INVENTION

Figure 1:
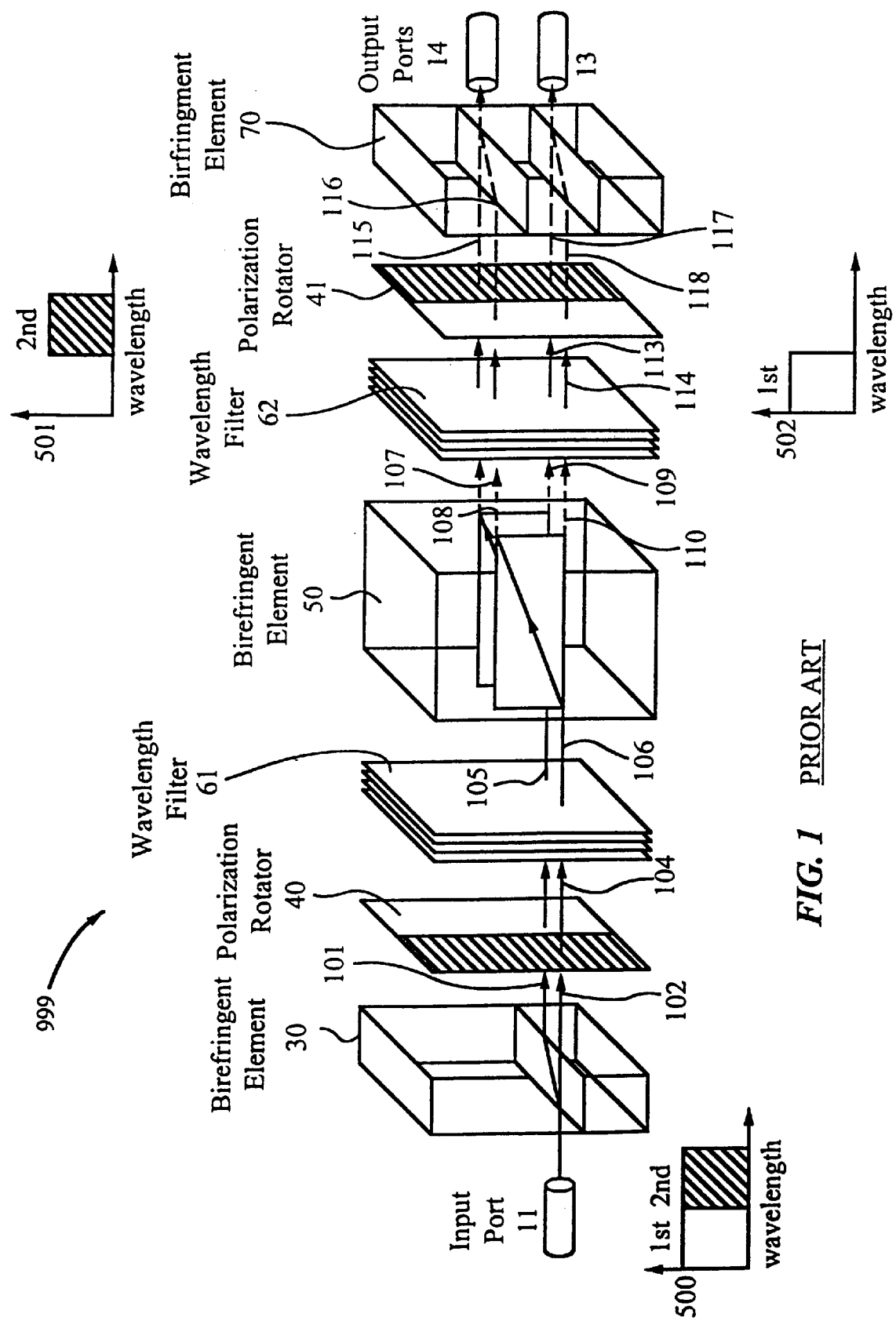
FIG. 1 shows a perspective view of an optical router with optical paths disclosed in a prior art Patent.
Figure 3A:
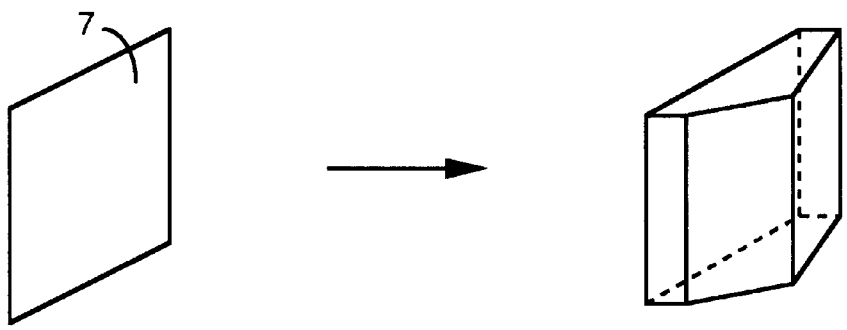
FIGS. 3A to 3C are isometric views of an incline angle means implemented in FIG. 2A shown as a preferred embodiment of a glass prism, a Wollaston prism and a Rochon prism respectively for implementing in an interleaver of this invention.
Figure 3B:
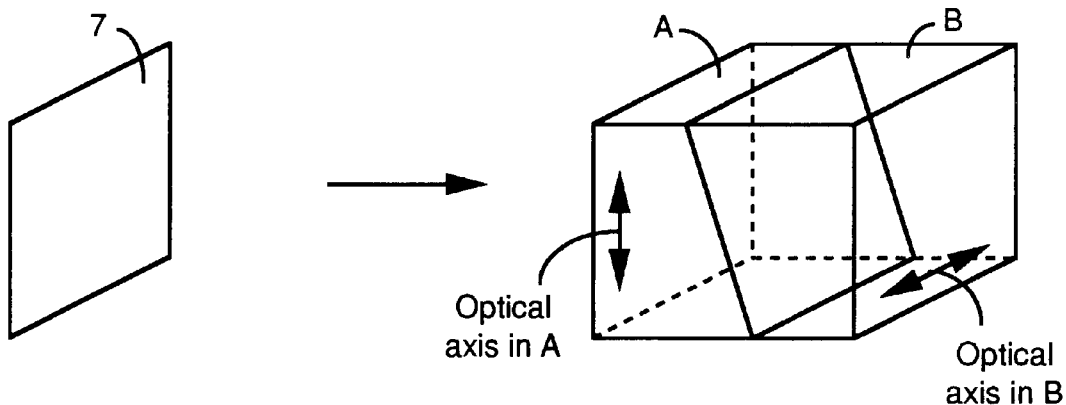
Figure 3C:
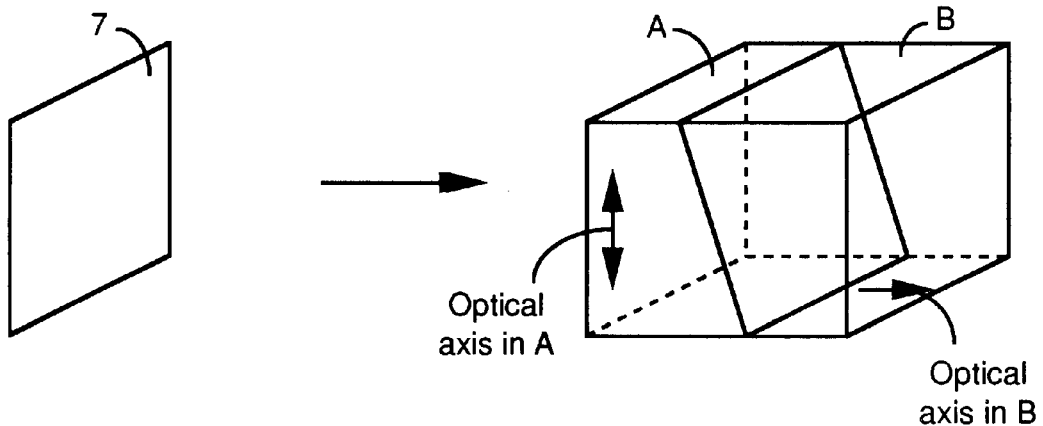

Referring to FIG. 2A for a perspective view for showing the basic structure, the optical path and state of polarization (SOP) of an interleaver 100 of this invention. A light beam including multiple wavelengths is projected through an input collimator onto an upper left (UL) quadrant of crystal 1. For a more comprehensive understanding of the changes in optical paths in transmitting through different optical components shown in FIG. 2A, the surface area of each optical elements is divided into four quadrants. Referring to FIG. 2B where the surface area is divided into an upper-left (UL) quadrant, an upper-right (UR) quadrant, a lower-left (LL) quadrant and a lower-right (LR) quadrant. The light beam is separated into an ordinary component and an extraordinary component by crystal 1, i.e., a birefringent crystal, and these two components are generally referred to as the o-component and e-component respectively. The states of polarization (SOP) of these two components are perpendicular to each other. The o-component passes through a glass plate 2 that covers only the o-beam thus compensates the optical path difference between two components, continues the transmission keeping the original polarization. On the other hand, the e-component is deflected to project to the lower-left (LL) quadrant passes through a polarization rotator 12 that only covers the e-beam thus rotates the state of polarization (SOP) of the e-component ninety degrees. These two components have a same SOP as marked by two dots shown in FIG. 2A. These two components are then projected onto a wavelength selection wave plate (WSWP), a type of Lyot filter. The WSWP 3 is designed as a half wave plate for certain wavelength $\lambda 1$ and a full wave plate for a desired adjacent wavelength $\lambda 2$. The length of the WSWP 3 is selected depending on the adjacent pass-band spacing $\lambda 1$–$\lambda 2$ and the difference of the refraction index as applied to the two components when passing through the WSWP 3. After passing the WSWP 3, the state of polarization of $\lambda 1$ is rotated ninety degrees and marked as a vertical bar in FIG. 2A while the state of polarization of wavelength $\lambda 2$ is unchanged and marked as a dot. At this stage, all the components of the optical beam of wavelength $\lambda 1$ have polarization represented by the vertical bars and all the components of the optical beam of wavelength $\lambda 2$ have polarization represented by the dots. The wave plate consists of two types of crystals with different optical properties versus thermal effects. By properly designing the ratio of lengths of the crystals, their thermal effects can be mutually canceled out. The wave plate 5 is identical to wave plate 3 to achieve the purpose of increasing the isolation of between two adjacent pass-bands.

The length and the diffraction index of the birefringent materials are temperature dependent. The materials with positive temperature coefficients are materials such as YVO4 can be used as part of WSWP. Another material with a different temperature coefficient such as NbLiO3 can be used at a different part of the WSWP. By properly designing the length of each part, optimal temperature compensation may be achieved in the interleaver disclosed in this invention.

A second birefringent crystal 4 then deflects all the light beams with polarization marked by dots to the right side of the crystal 4. Two components of the first wavelength $\lambda 1$ are transmitted via an optical path located on the left side while two components of the second wavelength $\lambda 2$ are transmitted via an optical path located on the right side. The wave plate 5 is another WSWP that is half wave plate for $\lambda 1$ and full wave plate for $\lambda 2$. The WSWP 5 changes the state of polarization of the first wavelength $\lambda 1$ to a polarization represented by dots. While the state of polarization of the second wavelength $\lambda 2$ maintains the polarization represented by dots. The polarization states for all components of the light are now identically marked with dots. The half wave-plate 6, only extends over the areas covering the optical paths the beam components passing through the UL and UR quadrants thus changing the polarization of these beam components to a polarization marked by bars. On the other hand, the glass plate 26 only extends over the areas of the lower two quadrants. And, the glass plate 26 does not cause changes to the polarization of the beam components transmitted through the LR and LL quadrants but provides compensation to optical path difference thus the beam components passing through the plate 26 maintain the original state of polarization (SOP).

An incline angle projection means 7 is employed in this interleaver 100 to project each of these beams at an inclined angle such that when the beam components are combined by a third birefringent crystal 8 into two beams, these two beams are projected with inclined angles aligned with the dual fibers of an output dual fiber collimator. Referring to FIG. 2A for an incline angle projection means 7. A decline angle is provided for $\lambda 1$ on the right side and a decline angle is provided for $\lambda 2$ on the left side. The decline angles are equal to the receiving angle for the fibers positioned in the dual fiber collimator. The fibers of the dual fiber collimator are placed in horizontal plane, symmetrical to the optical axis of the collimator lens that preferably is a GRIN lens. Since these fibers are arranged as right off or left off relative to the optical axis, for the purpose of receiving the light beams into these fibers, the projected beams must have proper inclined angles against the axis. The incline angle projection means 7 can therefore generate small incline angles that would be aligned with the receiving fibers of the dual fiber collimator. The light beam of the first wavelength $\lambda 1$ is then projected into a first fiber positioned at the right side and the light beam of the second wavelength $\lambda 2$ is projected into a second fiber positioned on the left side. When a series of wavelengths $\lambda 1, \lambda 2, \lambda 3, \ldots, \lambda n$ are transmitted through the interleaver 100 with equal or substantially equal wavelength spaces, the wavelengths, $\lambda 1, \lambda 3, \lambda 5, \ldots, \lambda n-1$, with the subscripted numbers 1, 3, 5, . . . , $\lambda n-1$) represent a set of odd numbers are projected into a first fiber and wavelength $\lambda 2, \lambda 4, \lambda 6, \ldots, \lambda n$ with the subscripted numbers 2, 4, 6, . . . , n, represent a set of even numbers would then be projected into a second fiber.

In a preferred embodiment, the incline angle projection means 7 is a glass prism. Alternatively, the incline angle projection means 7 can be Wollaston or Rochon prisms for the purpose of generating incline angle for the dual fiber collimator. The glass prism has two symmetric incline surfaces that provide equal decline angles for two parallel light beams striking on each surface. Since the Wollaston and Rochon prisms are polarization components, the Wollaston or the Rochon prism should be placed right behind the second birefringent crystal 4 such that the state of polarization of the optical beams can be properly adjusted. The configuration as that shown in FIG. 2A is an exemplary configuration only, different alternative arrangements may be made to project the optical beams in different quadrant with alternate states of polarization (SOP). Additionally, some alternate approaches may be implemented by replacing the birefringent crystal 1 and 8 in this invention by a pair of Wollaston prisms. A pair of Wollaston prisms with properly designed wedge angles can be applied with a first Wollaston prism to separate an input beam into two mutually orthogonal beam components projected to two different directions. These mutually orthogonal beams are then projected to a second Wollaston prism to generated two parallel out beam components, i.e., the e-component and o-component. Therefore, pair of Wollaston prisms can be implemented to provide the functions just like a birefringent crystal 1 and 8 of this invention. A pair of Wollaston prisms has a benefit that when a larger distance between the beam components are required, the pair of Wollaston prisms can achieve a savings of cost without using a long birefringent crystal. Furthermore, with a mirror symmetrical arrangement, a pair of Wollaston prisms can be employed to combine the o-component and the e-component to perform a function just like that provided by a birefringent crystal.

This invention discloses a new and improved optical interleaver. The interleaver includes an input port for receiving an input light beam including a plurality of wavelengths represented by $\lambda 1, \lambda 2, \lambda 3, \ldots, \lambda n$ where n is a positive integer. The interleaver further includes a group of optical elements, e.g., optical elements 1 to 6, for decomposing the input light beam into a first light beam including a first set of wavelengths represented by $\lambda 1, \lambda 3, \lambda 5, \ldots, \lambda n$ and a second light beam including of a second set of wavelengths represented by $\lambda 2, \lambda 4, \lambda 6, \ldots, \lambda n-1$. The first light beam and the second light beam transmitted respectively in a first and second optical paths, and the group of optical elements further decomposing and generating two sets of mutually orthogonally polarized and parallel beam-components {16-1, 16-1'} and {16-2, 16-2'}, from the first beam and second beam. The interleaver further includes an incline angle means 7 coupled to the group of optical elements for projecting the two sets of mutually orthogonally polarized and parallel beam-components for the first and second beam respectively with first and second incline angles relative to an optical axis of the interleaver. The interleaver further includes an output beam-component combining means 8 for combining the mutual orthogonally polarized and parallel beam-components into a first output beam 18-1 and a second output beam 18-2 projected with the first and second incline angles respectively relative to the optical axis of the interleaver. In a preferred embodiment, the interleaver further includes a dual fiber collimator 9 having a first optical fiber and a second optical fiber disposed with the first incline angle and the second incline angle relative to the optical axis of the interleaver for coupling to and directly receiving the first and second output beams from the output beam-component combining means 8.

In summary, this invention discloses an interleaver for separating a multiple wavelengths of an input light beam into a first output beam and a second output beam having two different sets of wavelengths. The interleaver includes an incline angle means 7 for projecting the first output beam and the second output beam with a small incline angle relative to an optical axis of the interleaver for the purpose of directly projecting into a first and a second optical fibers of an output dual-fiber collimator 9.

Therefore, the present invention discloses an improved design and configuration for manufacturing and assembling a fiber optic interleaver with reduced number of components to reduce the weight and volume and lower the production costs. Specifically, an interleaver of this invention is implemented with an improved configuration by employing an incline beam angle directing means for projecting the output beams with small incline angles. Preferably, the incline angle directing means may be a prism for projecting the output beams with small incline angles such that these output beams are received directly into a dual fiber collimator. The optical components are reduced and the optical paths are shortened. Insertion loss is reduced and the production cost is lowered with the improved configuration disclosed in this invention.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. An optical interleaver comprising:
an input port to receive an input light beam;
a group of optical elements for decomposing said input light beam into a first light beam including a first set of wavelengths represented by $\lambda 1, \lambda 3, \lambda 5, \ldots, \lambda n$ and a second light beam including of a second set of wavelengths represented by $\lambda 2, \lambda 4, \lambda 6, \ldots, \lambda n-1$, wherein said first light beam and said second light beam transmitted respectively in a first and second optical paths, and said group of optical elements further decomposing and generating two sets of mutually orthogonally polarized and parallel beam-components from said first beam and second beam; and
an incline angle means coupled to said group of optical elements for projecting said two sets of mutually orthogonally polarized and parallel beam-components for said first and second beam respectively with a first incline angle and a second incline angle relative to an optical axis of said interleaver.

2. The optical interleaver of claim 1 further comprising:
an output beam-component combining means for combining said mutual orthogonally polarized and parallel beam-components into a first output beam and a second output beam projected with said first and second incline angles respectively relative to said optical axis of said interleaver.

3. The optical interleaver of claim 2 further comprising:
a dual fiber collimator having a first optical fiber and a second optical fiber disposed off-axis of said collimator for directly receiving said first output beam and said second output beam projected respectively with said first and second inclined angles.

4. The optical interleaver of claim 1 wherein:
said incline angle means is a prism.

5. The optical interleaver of claim 1 wherein:
said incline angle means is a Wollaston prism.

6. The optical interleaver of claim 1 wherein:
said incline angle means is a Rochon prism.

7. The optical interleaver of claim 2 wherein:
said output beam-component combining means for combining said mutual orthogonally polarized and parallel beam-components into a first output beam and a second output beam is a birefringent crystal.

8. The optical interleaver of claim 1 wherein:
said group of optical elements for decomposing said input light beam into said first light beam and said second light beam includes at least a first birefringent crystal for transmitting said first light beam and said second light beam respectively in a first and second optical paths with mutually orthogonal states of polarization.

9. The optical interleaver of claim 1 wherein:
said group of optical elements further includes a wavelength sensitive wave plate (WSWP) having a temperature coefficient refraction index for compensating an optical path temperature-effect.

10. The optical interleaver of claim 9 wherein:
said wavelength sensitive wave plate (WSWP) further comprising wave plate of a positive temperature coefficient.

11. The optical interleaver of claim 9 wherein:
said wavelength sensitive wave plate (WSWP) further comprising wave plate of a negative temperature coefficient.

12. The optical interleaver of claim 9 wherein:
said wavelength sensitive wave plate (WSWP) further comprising a YVO4 wave plate.

13. The optical interleaver of claim 9 wherein:
said wavelength sensitive wave plate (WSWP) further comprising a NbLiO3 wave plate.

14. An optical system for separating a multiple wavelengths of an input light beam into a first output beam and a second output beam having two different sets of wavelengths, said optical system comprising:
an incline angle means for projecting said first output beam and said second output beam respectively with a first and second small incline angles relative to an optical axis of the optical system.

15. The optical system of claim 14 further comprising:
an output dual-fiber collimator having a first and second optical fibers for directly coupling to and receiving from said optical system said first beam and said second beam respectively each projected with said small incline angle.

16. The optical system of claim 14 further comprising:
an output beam-component combining means for combining two mutual orthogonally polarized and parallel beam-components generated from said input light beam into said first output beam and said second output beam projected with said first and second incline angles respectively relative to said optical axis of said optical system.

17. The optical system of claim 14 wherein:
said incline angle means is a prism.

18. The optical system of claim 14 wherein:
said incline angle means is a Wollaston prism.

19. The optical system of claim 14 wherein:
said incline angle means is a Rochon prism.

20. The optical system of claim 16 wherein:
said output beam-component combining means for combining said mutual orthogonally polarized and parallel beam-components into said first output beam and said second output beam is a birefringent crystal.

21. The optical system of claim 14 further comprising:
a first birefringent crystal for decomposing input light beam into said first light beam and said second light beam and transmitting said first light beam and said second light beam respectively in a first and second optical paths with mutually orthogonal states of polarization.

22. The 14 optical system of claim 14 further comprising:
a wavelength sensitive wave plate (WSWP) having a temperature coefficient refraction index for compensating optical paths temperature-effect.

23. The optical system of claim 22 wherein:
said wavelength sensitive wave plate (WSWP) further comprising wave plate of a positive temperature coefficient.

24. The optical system of claim 22 wherein:
said wavelength sensitive wave plate (WSWP) further comprising wave plate of a negative temperature coefficient.

25. The optical system of claim 22 wherein:
said wavelength sensitive wave plate (WSWP) further comprising a YVO4 wave plate.

26. The optical system of claim 22 wherein:
said wavelength sensitive wave plate (WSWP) further comprising a NbLiO3 wave plate.

27. A method of applying an interleaver for separating a multiple wavelengths of an input light beam into a first output beam and a second output beam having two different sets of wavelengths, said method comprising a step of:
employing an incline angle means for projecting said first output beam and said second output beam respectively with a first and second small incline angles relative to an optical axis of the interleaver.

28. The method of claim 27 further comprising:
employing an output dual-fiber collimator provided with a first and second optical fibers for directly coupling to and receiving from said interleaver said first beam and said second beam respectively each projected with said small incline angle;
employing an incline angle means for projecting said first output beam and said second output beam respectively with a first and second small incline angles relative to an optical axis of the interleaver.

29. The method of claim 27 further comprising:
employing an output dual-fiber collimator provided with a first and second optical fibers for directly coupling to and receiving from said interleaver said first beam and said second beam respectively each projected with said small incline angle.

* * * * *